US011947699B2

(12) United States Patent
Malhotra et al.

(10) Patent No.: US 11,947,699 B2
(45) Date of Patent: Apr. 2, 2024

(54) MICROSEGMENT SECURE SPEECH TRANSCRIPTION

(71) Applicant: MICROSOFT TECHNOLOGY LICENSING, LLC, Redmond, WA (US)

(72) Inventors: Hemant Malhotra, Newark, CA (US); Xuedong Huang, Bellevue, WA (US); Li Jiang, Kirkland, WA (US); Ivo Jose Garcia Dos Santos, Kirkland, WA (US); Dong Li, Seattle, WA (US); Shuangyu Chang, Davis, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/919,941

(22) PCT Filed: Apr. 30, 2021

(86) PCT No.: PCT/US2021/030208
§ 371 (c)(1),
(2) Date: Oct. 19, 2022

(87) PCT Pub. No.: WO2021/225894
PCT Pub. Date: Nov. 11, 2021

(65) Prior Publication Data
US 2023/0153451 A1    May 18, 2023

(30) Foreign Application Priority Data

May 4, 2020 (LU) ........................................ 101763

(51) Int. Cl.
*G06F 21/62* (2013.01)
(52) U.S. Cl.
CPC .............................. *G06F 21/6218* (2013.01)

(58) Field of Classification Search
CPC .................................................. G06F 21/6218
See application file for complete search history.

(56) References Cited

U.S. PATENT DOCUMENTS

| 6,963,425 | B1 * | 11/2005 | Nair | .......................... | G06T 7/90 |
|           |      |         |      |                            | 358/1.9   |
| 7,020,606 | B1 * | 3/2006  | Class | .................... | G10L 15/193 |
|           |      |         |      |                            | 704/E15.022 |

(Continued)

FOREIGN PATENT DOCUMENTS

| LU | 101763 | 5/2020 |
| WO | PCT/US21/030208 | 4/2021 |

OTHER PUBLICATIONS

"Amazon Transcribe: Developer Guide", Retrieved from: https://web.archive.org/web/20180921150548/https://docs.aws.amazon.com/transcribe/latest/dg/transcribe-dg.pdf, Sep. 21, 2018, 75 Pages.

(Continued)

*Primary Examiner* — Jason Chiang
(74) *Attorney, Agent, or Firm* — Workman Nydegger

(57) ABSTRACT

Embodiments are provided for securing data access to machine learning training data at a plurality of distributed computing devices. Electronic content including original data that corresponds to a preferred data security level is divided into a plurality of microsegments. The plurality of microsegments is restrictively distributed to a plurality of computing devices which apply transcription labels to the plurality of microsegments. The labeled microsegments are reconstructed into training data which is then used to train a machine learning model while facilitating an improvement in data security of the original data included with the training data from the reconstructed microsegments.

14 Claims, 10 Drawing Sheets

(56) References Cited

U.S. PATENT DOCUMENTS

| | | | |
|---|---|---|---|
| 7,716,048 B2 | 5/2010 | Pereg et al. | |
| 8,098,670 B2* | 1/2012 | Okazaki | H04L 12/2856 370/401 |
| 8,543,398 B1 | 9/2013 | Strope et al. | |
| 8,713,329 B2* | 4/2014 | Schneider | H04L 9/085 713/168 |
| 8,930,896 B1* | 1/2015 | Wiggins | H04L 63/0421 717/115 |
| 8,935,167 B2 | 1/2015 | Bellegarda | |
| 10,034,028 B2* | 7/2018 | Polumbus | G10L 15/22 |
| 10,573,312 B1* | 2/2020 | Thomson | G10L 15/22 |
| 10,607,599 B1 | 3/2020 | Shellef et al. | |
| 10,963,590 B1* | 3/2021 | Dash | G06F 21/604 |
| 11,183,181 B2* | 11/2021 | Hartung | G10L 15/22 |
| 11,574,366 B1* | 2/2023 | Clymer | G07C 5/0808 |
| 11,587,210 B1* | 2/2023 | Chen | G06T 7/80 |
| 2005/0165972 A1* | 7/2005 | Miyata | H04L 67/1097 710/1 |
| 2007/0081428 A1 | 4/2007 | Malhotra et al. | |
| 2009/0234635 A1* | 9/2009 | Bhatt | G06F 40/58 704/235 |
| 2010/0010968 A1* | 1/2010 | Redlich | G06Q 10/00 707/E17.046 |
| 2011/0087491 A1 | 4/2011 | Wittenstein et al. | |
| 2011/0087785 A1* | 4/2011 | Kibler | G06Q 10/10 709/226 |
| 2011/0197199 A1* | 8/2011 | Isaka | G06F 21/50 718/107 |
| 2013/0111552 A1* | 5/2013 | Grube | H04W 12/02 726/3 |
| 2014/0136832 A1* | 5/2014 | Klum | G06F 11/1451 713/150 |
| 2015/0324371 A1* | 11/2015 | Guo | G06F 16/1827 707/693 |
| 2016/0196464 A1* | 7/2016 | Oda | G06T 7/0012 382/133 |
| 2018/0181881 A1* | 6/2018 | Du | G06N 7/01 |
| 2018/0206752 A1* | 7/2018 | Bardy | A61B 5/341 |
| 2019/0026553 A1* | 1/2019 | Deshpande | G06N 20/00 |
| 2019/0065907 A1* | 2/2019 | Strong | G06F 18/217 |
| 2019/0073447 A1* | 3/2019 | Guo | G06V 10/7784 |
| 2019/0110753 A1* | 4/2019 | Zhang | G16H 50/20 |
| 2019/0156822 A1* | 5/2019 | Manuvinakurike | G10L 25/78 |
| 2019/0205606 A1* | 7/2019 | Zhou | G06V 10/454 |
| 2019/0318731 A1 | 10/2019 | Jost et al. | |
| 2019/0325276 A1* | 10/2019 | Fu | G06N 3/084 |
| 2019/0392859 A1* | 12/2019 | Li | G10L 25/84 |
| 2020/0020319 A1 | 1/2020 | Malhotra et al. | |
| 2020/0065876 A1* | 2/2020 | MacKenzie | G06Q 30/0627 |
| 2020/0162391 A1* | 5/2020 | Savalle | G06N 20/00 |
| 2020/0169391 A1* | 5/2020 | Kapp | H04L 9/40 |
| 2020/0228322 A1* | 7/2020 | Bridges | H04L 9/0822 |
| 2021/0042530 A1* | 2/2021 | Kim | G06F 18/214 |
| 2021/0192221 A1* | 6/2021 | Iyer | G06N 20/00 |
| 2021/0312621 A1* | 10/2021 | Chou | G06T 7/62 |

OTHER PUBLICATIONS

"Speech", Retrieved from: https://azure.microsoft.com/en-us/services/cognitive-services/speech-services/, Retrieved on: Oct. 14, 2022, 4 Pages.

"Speech-to-Text Basics", Retrieved from: https://cloud.google.com/speech-to-text/docs/basics, Oct. 12, 2022, 15 Pages.

Kalamani, et al., "Review of Speech Segmentation Algorithms for Speech Recognition", In International Journal of Advanced Research in Electronics and Communication Engineering, vol. 3, Issue 11, Nov. 2014, pp. 1572-1574.

Kornich, et al., "Content Protection Overview", Retrieved from: https://web.archive.org/web/20201029122844/https://docs.microsoft.com/en-us/azure/media-services/previous/media-services-content-protection-overview, Apr. 1, 2019, 6 Pages.

"Search Report and Written Opinion Issued in Luxembourg Patent Application No. LU101763", dated Jan. 29, 2021, 9 Pages.

"International Search Report and Written Opinion Issued in PCT Application No. PCT/US21/030208", dated Jul. 30, 2021, 12 Pages.

Pleva, et al., "Automatic Acoustic Speech Segmentation in Praat using Cloud Based ASR", In Proceedings of 25th International Conference Radioelektronika, Apr. 21, 2015, 4 Pages.

Roy, et al., "Fast Transcription of Unstructured Audio Recordings", In Proceedings of the 10th Annual Conference of the International Speech Communication Association, Sep. 6, 2009, 4 Pages.

"Notice of Allowance Issued in European Patent Application No. 21726023.1", dated Oct. 26, 2023, 2 Pages.

"Notice of Allowance Issued in European Patent Application No. 21726023.1", dated Jul. 11, 2023, 8 Pages.

* cited by examiner

MICROSEGMENT SECURE SPEECH TRANSCRIPTION

BACKGROUND

Speech recognition technology, which includes the use of natural language processing (NLP), relies on a large amount of high-quality labeled data to train deep learning models and other machine-learned models that are utilized for NLP processes.

One of the most important sources of training data is customer usage data. This data often matches specific user scenarios for which the NLP models can be very usefully applied.

For training data to be effective in training a model, the labels used as the ground truth for the data must be extremely accurate. One of the more relied upon methods to obtain these labels or transcriptions for the training data is to use human transcription. However, the process of human transcription poses data security and/or data privacy risks because human transcription inherently requires a human to listen to the customer usage data including customer speech data and provide an accurate transcription label. Thus, any private information or data included in the customer usage data will be exposed to a human transcriber. The customer from whom the usage data is retrieved may not want to have their private data exposed to an unknown, or even a known, human transcriber.

By way of example, some training data is obtained from consumer speech recognition (SR) devices and systems where a user (i.e., consumer, customer) may use the SR device to input confidential data such as passwords, bank information, and/or credit card information. This data is then sent to a transcription service to label the training data for training and/or fine-tuning the models that are used to perform the NLP processes. In some examples, data potentially containing private consumer data is retrieved from non-speech data sources, such as text, image, and/or video data, for additional applications (e.g., optical character recognition (OCR) applications.

Historically, companies working on speech recognition have relied on third-party vendors to transcribe speech data. In response to heightened risks and an overall increase in consumer data privacy awareness, some companies have implemented changes in their speech transcription practices. In some instances, for example, some companies now employ full-time staff to perform labeling of the company data, assuming that the use of full-time company employees is more secure and less risky than using third-party vendors. At the very least, the company can monitor, track, and regulate the exposure of their data using the company's own secured network and computers rather than having to rely on third party assurances. However, many companies are unable to allocate enough resources and employees to transcribe the immense amount of data that is needed to be transcribed in order to develop enough training data for training the machine learning model for speech recognition and other NLP processes.

Currently, there are no methods for speech recognition systems that are proven to work more effectively than those that are trained with human labeled training data. Accordingly, there in an ongoing and persistent need for improved systems, methods, and devices for securing data access to machine learning training data, including for securing data access to training data obtained from consumer usage data for training NLP models that are used in performing NLP processing for consumer usage scenarios. In particular, there is an ongoing need and desire to develop systems and methods to develop human labeling processes that facilitate and/or improve upon techniques for preserving privacy and confidentiality of the data being labeled.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Embodiments disclosed herein relate to systems, methods, and devices that are configured to facilitate varying levels of data security, and even more particularly, for systems, methods, and devices that can be utilized for securing data access to machine learning training data at a plurality of distributed computing devices.

In some embodiments, electronic content is retrieved from a source corresponding to a preferred level of data security. The electronic content is divided into a plurality of microsegments where the division process is based on the preferred data security level. Once divided, the plurality of microsegments is distributed to a plurality of computing devices. During distribution, only a certain number of microsegments from any one source is distributed to the same computing device. In this manner, no computing device, nor any user(s) of the computing device(s), may access the entirety of the electronic content that was distributed to the computing devices. Thus, the microsegment distribution of the electronic content can facilitate data security of the underlying data, for example, by selectively restricting access to the underlying data.

Disclosed embodiments include computer-implemented methods for securing data access to machine learning training data at a plurality of distributed computing devices. Some disclosed methods include a computing system receiving electronic content which contains original data pertaining to one or more speakers from which the original data was obtained. Once the electronic content is compiled, the computing system determines a security level associated with the electronic content. The computing system then selectively divides the electronic content into a plurality of microsegments. Each microsegment is of a duration that is selected according to the determined security level. After the electronic content is divided, the computing system identifies a plurality of destination computing devices configured to apply a plurality of labels corresponding to the plurality of microsegments. The microsegments are then selectively distributed to destination computing devices, while restricting the distribution to any particular computing device such that only a pre-determined quantity of microsegments from a particular data set of the original data will to be distributed to any one of the destination computing devices.

In some embodiments, the computing system identifies one or more attributes of a particular microsegment. In the case that the attribute corresponds to an increased level of data security, the computing system further divides the microsegment into fragments.

In some embodiments, the computing system causes the plurality of computing devices to apply a plurality of labels to the plurality of distributed microsegments, or microsegment fragments. Once the microsegments are labeled, the computing system reconstructs the now labeled microsegments into reconstructed electronic content including training data for a machine learning model. Subsequently, the computing system trains the machine learning model using the training data from the reconstructed electronic content without exposing the entirety of the electronic content to a single computing device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed. Disclosed embodiments also are directed to systems, methods, and devices configured to facilitate an improvement in data security, for example for a speech transcription process and/or training of a machine learning model.

Figure 1:
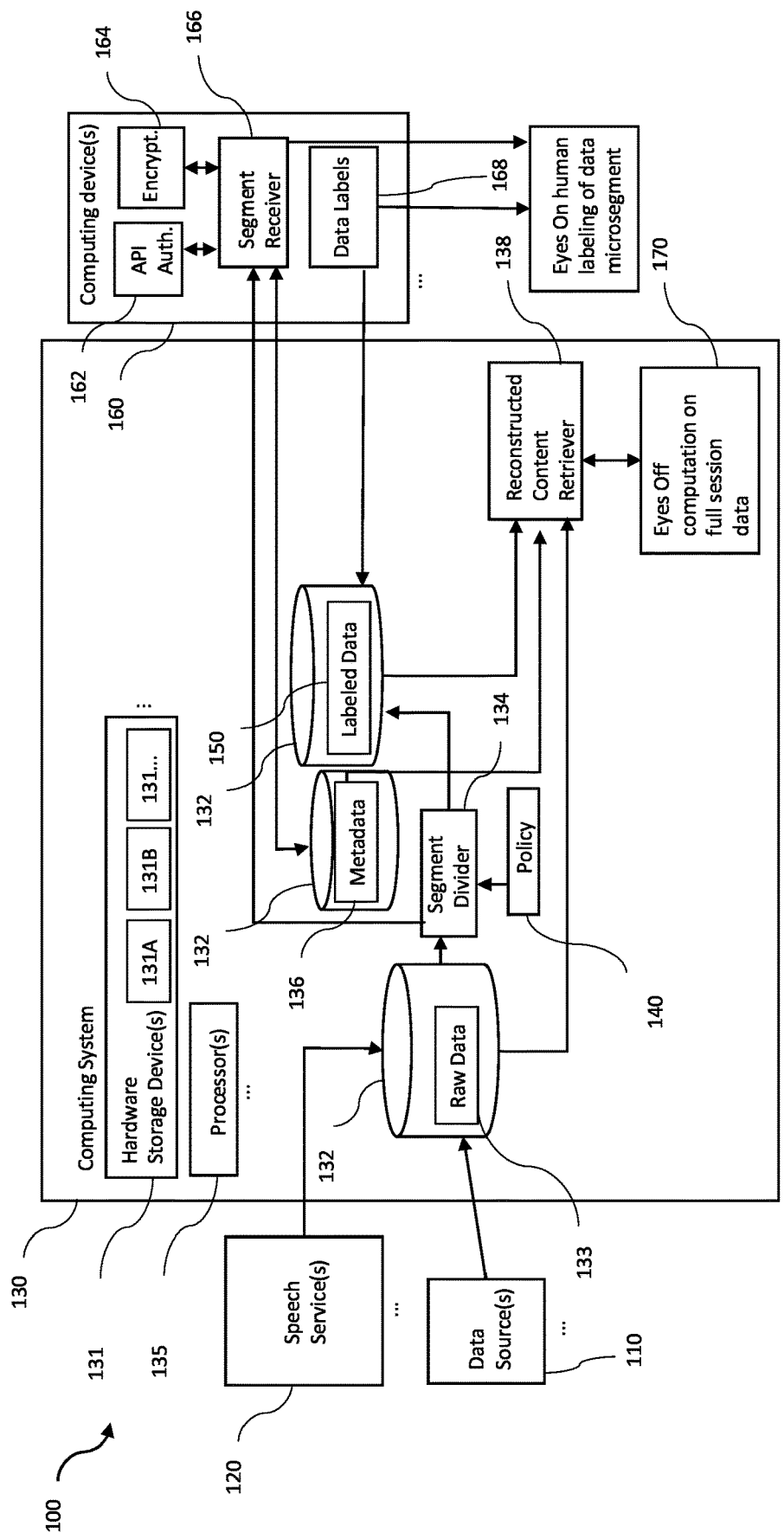
FIG. 1 illustrates an example architecture that includes a computing system that includes and/or that is capable of being utilized to implement the disclosed embodiments.

FIG. 1 illustrates an example computing architecture 100 for implementing the disclosed embodiments and which includes a computing system 130 including various components that will now be described, each of which is stored within the hardware storage devices(s) 131 of the computing system 130 and/or within one or more remote system(s).

As shown the computing system 130 includes hardware storage device(s) 131 and one or more processor(s) 135. The hardware storage device(s) 131 stores one or more computer-executable instructions 131A, 131B, 131 . . . (i.e., code) which is executable by the one or more processor(s) 135 to instantiate other computing system components (e.g., the segment divider 134, the segment receiver 146, the reconstructed content retriever 138, the Eyes Off computation 170, etc.). The processor(s) 135 also execute the computer-executable instructions 131A, 131B to implement the disclosed methods, such as the methods referenced in FIGS. 2-10.

While the hardware storage device(s) 131 is presently illustrated containing the computer executable instructions 131A, 131B, 131 . . . (the ellipses indicating any number of computer executable instructions), it will be appreciated that this visual segregation from other components included in the computer architecture 100 and/or computing system 130 is done merely to facilitate the discussion herein and should not be construed as representing any actual physical separation of storage components or the distribution of the illustrated components to different physical storage containers. It is also noted that the hardware storage devices(s) 131 is configurable to be segmented (e.g., partitioned) into different storage containers. In some instances, the hardware storage device(s) 131 comprise(s) one or more hard drives. Additionally, or alternatively, the hardware storage devices(s) 131 comprise(s) flash storage and/or other durable storage and/or a combination of a hard drive and other durable storage.

The hardware storage device(s) 131 is/are presently shown as being maintained entirely within a single computing system 130. In some embodiments, the hardware storage device(s) is/are distributed between different computers and/or computing systems, such as remote system(s) (not illustrated), which are connected through one or more wired and/or wireless network connection(s). In such instances, the computing system 130 is viewed as a distributed computing system that includes one or more computing systems and/or one or more destination computing device(s) 160 that each comprise their own storage and corresponding computing components to enable the disclosed functionality (such as those described in reference to computing system 130).

The computing system 130, as shown, includes a data store 132 which stores raw data 133, such as speech data utterances, audio files and other raw data (e.g., image data, text data, audio-visual data such as video recordings, or other electronic content). Speech-based data is typically used during speech recognition applications, wherein the speech data is transcribed (i.e., human labeled). In some embodiments associated with optical character recognition (OCR) applications, for example, data labeling (i.e., human labeling and/or annotation) is performed on non-speech and/or image-based data.

The data store 132, in some instances, also stores corresponding metadata 136 that defines attributes of the raw data 133. In some instances, the metadata 136 includes metadata detected from the speech services 120, including detected phrase timings, recognition text, recognition confidence, and/or sentence end confidences, among other types of metadata (e.g., data type, source, date, formatting, privacy settings, authorship or ownership, etc.). The data store 132 also includes, in some instances, labeled data 168, which will be described in more detail below. Additionally, although not shown, the data store 132 also comprises or includes, in some instances, the hardware storage device(s) 131 that store the computer-executable instructions for implementing the disclosed functionality described herein.

In some instances, the data stored in data store 132 is encrypted, such as the raw data 133 being encrypted and such that no human or computing entity has unrestricted and/or eyes-on access to the raw data directly.

While the data store 132 is presently shown as being distributed, it will be appreciated that the data store 132 may also comprise a single database and may not be distributed on different physical storage devices.

It should also be appreciated that the data store 132 stores electronic content from any combination of one or more different data sources 110. The electronic content of the raw data 133 (and corresponding metadata 136), for example, may include speech or audio data for and/or from one or more different speech recognition systems and/or speech services 120. The electronic content received from the data sources 110 can be discrete files of content and/or streaming content.

The segment divider 134 divides (i.e., shreds, segments, parses, truncates, breaks, etc.) the full utterances into microsegments (i.e., pieces, shreds, segments, etc.) based on policies 140. The segment divider 134 also oversees handling for the content for the overlaps of microsegments and monitors any errors in speech segmentation introduced by any one of the processes implemented by any one of the components of the computer architecture 100. In some instances, the segment divider 134 receives electronic content from the data store 132 wherein the electronic content includes sentences (i.e., utterances and/or candidates for segmentation) that are prioritized for human review based on recognition confidence and sentence confidence scores associated with the electronic content. In some embodiments, these recognition confidence and sentence confidence scores, including other attributes, are included in the metadata corresponding to the electronic content in the data store 132 storing raw data 133 and/or stored in the data store 132 storing metadata 136.

In some embodiments, the segment divider 134 is configured to implement any one of the methods for segmentation, for example as illustrated in FIGS. 2-7. In some embodiments, the segment divider 134 segments electronic data into microsegments on-demand (e.g., in response to request for segmentation and/or a request to transcribe electronic content). Additionally, or alternatively, the segment divider 134 segments/divides the electronic content before the request is made, for example, when electronic content (with or without associated metadata) is identified as being stored in the data store 132 and when such data is available for segmentation. In some embodiments, the segment divider 134 is configured to include a plurality of modes (e.g., a naïve mode and/or a smart mode). In some instances, when the segment divider 134 operates in a naïve mode, the segmentation process implemented by the segment divider 134 is associated with a static segmentation process. In some embodiments of static segmentation, each utterance is divided into microsegments of equivalent durations and/or each utterance is divided into microsegments based on global policies 140, which are, in some instances static and/or at least unchanging during the segmentation.

In some instances, when the segment divider 134 operates in a smart mode, the segment divider 134 dynamically segments electronic content into microsegments using sentence end confidence scores or other metadata that can be used to identify natural speech breaks and/or associated levels of data security. Thus, the segment divider 134 may be implemented as a machine learning model, deep learning algorithm and/or any machine-learned model that is trained and/or fine-tuned to learn best modes and corresponding best policies for segmentation processes based on attributes of the electronic content.

In some embodiments, the segment divider 134 performs dynamic segmentation when operating in the smart mode, which includes the segment divider 134 dividing utterances into microsegments of varying durations based on unique characteristics or attributes of the utterances that are identified during the segmentation. In this manner, different policies, such as policy 140 from a plurality of available policies will be selected and applied uniquely to each utterance and/or microsegment during the segmentation process based on the detected attributes of the utterances being segmented.

In some embodiments, the segment divider 134 is configured to perform segmentation, according to the plurality of methods disclosed herein, for non-speech data, wherein text in an OCR image is divided into microsegments (i.e., the original image is subdivided into a plurality of smaller images). In this manner, the smaller images (i.e., image segments, fragments, frames, pieces, etc.) include only a portion of the original image, or in other words, the smaller image includes a few words of the plurality of words included in the full, original image.

It will be appreciated that the policy 140 or policies are configured as rules or guides for determining the segmentation process as implemented by the segment divider 134. In some embodiments, the policies 140 include determining media time (i.e., duration). For example, for consumer data (the consumer data corresponding to a level of data security) the policy 140 specifies a pre-determined window of time or duration (e.g., 8 seconds) that can be mapped to a plurality of words (e.g., 7-10 words). On more sensitive data, or data corresponding to an increased level of data security as compared to the consumer data, a shorter window (e.g., a window of less than, for example 2-3 seconds), is dictated by the policy 140 to protect the content of the data retrieved from the data store 132 (e.g., raw data 133).

In some embodiments, the policy 140 includes a pre-determined quantity of words (e.g., N-word limit). In such instances, word boundaries of electronic content (e.g., raw data 133) retrieved from the data store 132 are determined for individual words occurring in the electronic content. In some instances, the metadata 136 corresponding to the electronic content includes word count and word boundary information which is then used to determine the N-word limit segmentation.

Additionally, or alternatively, the policy/policies 140 is/are based on recognition text. For example, the segment divider 134 may be configured to break after N-consecutive digits or characters. This is beneficially done for electronic data or subsequent microsegments of electronic data including numerically-based keywords (i.e., numerically-based attributes), for example, credit card numbers, identification numbers (e.g., social security, driver's license, and/or passport numbers), transaction confirmation numbers, bank account information, routing numbers, passwords, and/or based on other attributes identified by the computing system 130, wherein the attributes correspond to a preferred level of data security associated with the electronic content.

In some instances, the attributes and/or identified keywords (the attributes and/or keywords corresponding to a level of data security, the attributes and/or keywords being numerically or non-numerically based) are split between microsegments or split between microsegment fragments (i.e., microsegments that are further divided into fragments). In some instances, the attributes and/or keywords are omitted from the microsegments.

In some embodiments, the policy 140 also includes segmentation rules based on a prediction of speech versus silence and/or based on a probability of a microsegment containing speech. In some embodiments, the policy 140 directs the segment divider 134 to segment electronic content based on natural speech breaks identified in the electronic content. In instances where natural speech breaks are used, the subsequent microsegments have a beneficially decreased probability of including partial or truncated words.

Thus, in some embodiments, the policies 140 are directed toward static determination of segmentation processes and methods, wherein a pre-determined length and/or duration of each microsegment is used to segment the electronic content. In some embodiments, the pre-determined length corresponds to a known data source from the plurality of data sources 110 and/or identified attributes of a data source from which the electronic content is obtained. In some embodiments, the policies 140 cause dynamic segmentation (i.e., segmentation implemented using differently applied policies based on attributes of the electronic content being segmented).

In some embodiments, the attributes of the electronic content (e.g., raw data 133), and subsequently identified attributes of the microsegments, are stored in the data store 132 housing metadata 136. This metadata 136, along with the microsegments generated by the segment divider 134 are retrieved and/or sent (i.e., a push-data and/or pull data system) to the segment receiver 166 of computing device 166, after an authorization process.

The segment receiver 166 ensures that the same client (i.e., computing device) does not get more than X-number of microsegments and/or that Y % of a given utterance (i.e., set or subset of electronic content) is not retrieved for labeling at a given time.

Conceptually, the segmentation process, also referred to herein as a microsegmentation process associated with forming the microsegments, is similar to shredding a credit card into multiple bins and ensuring that contents from those bins are not available to any single client to enhance security of the data associated with the credit card.

Additionally, in some embodiments, the requests to label microsegments are protected and authenticated for user access. For each raw data 133 item that is not completely human labeled, there is a maintained list of hashes that map against the hash of a user percentage segment list length and which is correlated with destination devices that request/receive the different data. In some embodiments, there are multiple transcriptions for a single raw data 133 item (i.e., electronic content). The disclosed systems maintain the trackers/tracking information that maps the hashes to recipient/requesting systems until the transcription for the entire utterance or target portion of the raw data 133 is complete.

In some embodiments, segmentation is performed via partial encryption and key chain applications.

This configuration beneficially facilitates the ability of the computing system to track each request from each computing device so that the computing system will ensure that the policies 140 associated with the microsegments are being met. Furthermore, there is a stored database of which microsegments are transcribed by which computing devices, even after the microsegments are reconstructed.

In some embodiments, before a computing device 160 is able to access microsegments of electronic content, and associated metadata, the identity of the computing device must be confirmed and authorized as a computing device having permissions to access the microsegments. In some examples, the computing device corresponds to an identifier of a plurality of identifiers which indicate previously authorized computing devices. In some instances, the authorization is based on a pre-determined threshold corresponding to a level of data security associated with the electronic content, wherein some recipient computing devices are permitted access to and/or sent segments of a defined set of data content up to a certain absolute magnitude and/or percentage of the total data set that is segmented, based on the level of data security associated with the content and/or based on security clearances associated with different recipient systems.

In some embodiments, this authorization process will be pre-determined and/or pre-configured. In some embodiments, each time a computing device requests access to one or more microsegments and/or a device is identified as a potential target to receive a microsegment, that device is screened for authorization and is authorized via an API authorization platform prior to the microsegment(s) being sent to that device. It should also be appreciated that the identifiers corresponding to the computing devices and/or the microsegments and/or the microsegment metadata are encrypted via an encryption system 164.

Once a computing device is authorized and receives one or more microsegments, the computing device is able to apply one or more labels to the one or more microsegments via eyes-on human labeling of data microsegments 180. In some embodiments, the data labels 168 are sent to the data store 132 storing labeled data 150, which includes already distributed microsegments, associated metadata, and corresponding transcription labels. In some embodiments, the labeled data 150 is reconstructed electronic content, wherein the microsegments have been reconstructed based on an original sequencing of the microsegment content before being divided from the original electronic content. It should be appreciated that data labels 168 may be referenced as transcription labels and/or transcriptions and/or simply labels described herein and/or referenced throughout the figures.

Once the data segments are labeled, a reconstructed content retriever 138 retrieves the reconstructed set(s) of microsegments of labeled data 150, metadata 132, and/or other raw data 133, wherein the computing system will perform eyes-off computation on full-session data 170. This computation includes training of models, algorithms, and/or other data post processing.

By making use of eyes-off computation, segmentation and reconstruction, the computing system and overall transcription process facilitates increased security for the underlying data and a reduction in privacy risk (i.e., increase in data security) in end-to-end systems. Not only is the exposure of the data minimized during transcription for the generation and use of training data for machine learning models, the same principles can be applied during evaluation tests and/or debugging of the machine learning models. In some instances, the model training is governed within a compliance boundary wherein some data metrics, such as word error recognition, are able to be retrieved from the compliance boundary. In some instances, the evaluation and/or debugging entities are only able to access microsegments including a large amount of errors.

In this manner, eyes-on labeling is restricted to having access to only certain portions of the electronic content from which the microsegments were parsed, while no human entity or computing device corresponding to a human entity has access to the entirety of the electronic content, thus preserving a level of data security of the raw data 133 which may include sensitive consumer data.

In some embodiments, data access is governed by user permission and follow compliance rules such as any user activity associated with JIT (Just in Time) applications and audit logged activity. Through the data access service, the computing device (and/or corresponding user) is able to access an encrypted microsegment of the raw data 133. In some embodiments, the encryption is AES-128 keys or even more secure. It is anticipated that the speech data will be MP4 encoded in MPEG-DASH format and will not be available for download. The encryption keys and playback asset link generated for the microsegment for the computing device (and/or transcriber), or a subset of microsegments, will expire in a policy-based limit, for example five minutes.

Methods for Generating Microsegments

Figure 2:
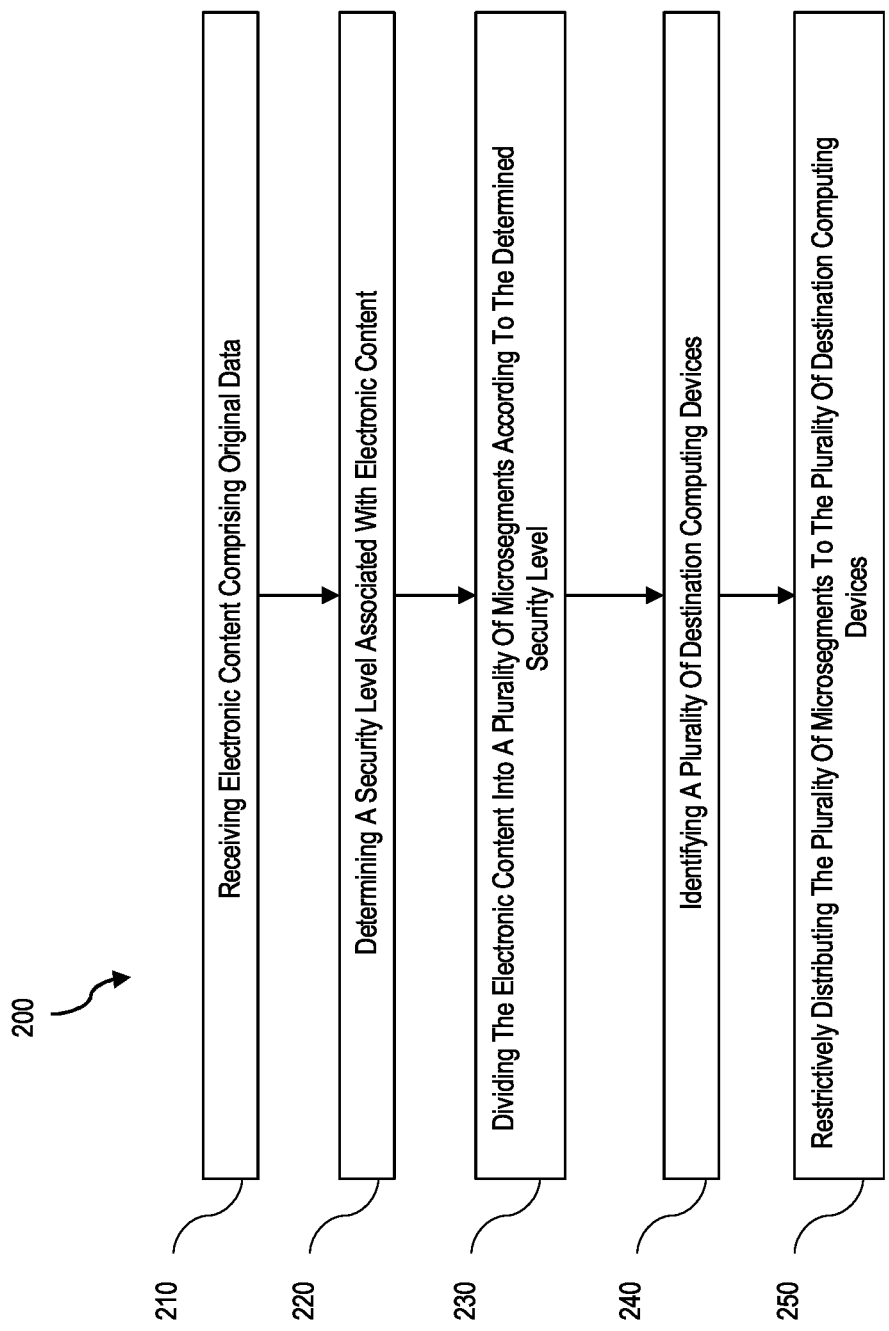
FIG. 2 illustrates a flow diagram of an example method for securing data access to electronic content for transcription.

Attention will now be directed to FIG. 2 which illustrates a flow diagram 200 that includes various acts associated with exemplary methods that can be implemented by computing systems, such as computing system 130 described above in reference to FIG. 1 and/or that are associated with securing data access to machine learning training data during labeling processes of the corresponding data.

As shown in FIG. 2, the flow diagram 200 and corresponding methods include an act of a computing system receiving electronic content comprising original data (act 210). The computing system then determines a security level associated with the electronic content (act 220). Thereafter, the computing system selectively divides the electronic content into a plurality of microsegments by duration, the duration of the microsegments being selected, at least in part, according to the determined security level (act 230). Thereafter, the computing system identifies a plurality of destination computing devices configured to apply a plurality of labels corresponding to the plurality of microsegments (act 240). Finally, the computing system selectively and restrictively distributes the plurality of microsegments to the plurality of destination computing devices (act 250). Notably, the act of distributing the microsegments (act 250) also includes, in some instances, limiting or otherwise restricting distribution of the microsegments so that only a pre-determined quantity of microsegments from the original data (or a predefined data set of the original data) is distributed to any one of the destination computing devices.

It should be appreciated that, in some instances, the electronic content (act 210) includes the raw data 133 stored in data store 132 and/or that is obtained directly from one or more remote data source(s) 110 and/or speech service(s) 120.

Additionally, in some instances, the original data (or a predefined data set from the original data) comprises consumer usage data that includes private, sensitive, and/or confidential data from one or more consumer. Thus, the determined security level that is determined for the electronic content (act 220) will be based on attributes of the data source 110, such as if it is a private or public data source and/or if speakers associated with the data source have pre-authorized sharing of their data collected by speech services. In some instances, the attributes are identified by the data sources/speech services. In other instances, the attributes are independently and automatically identified by the computing system 130 during processing of the electronic content when it is received. The attributes are specified, in some instances, with metadata associated with the electronic content at the time the electronic content is received and/or after it is processed.

The act of dividing the electronic content into microsegments will be implemented by the segment divider 134, as illustrated in FIG. 1. The process of dividing the electronic content, which may also be referred to as segmenting, shredding or splitting the electronic content into microsegments will be described in more detail below.

Referring to the act of identifying a plurality of destination computing devices (act 240), the destination computing devices may be one or more computing devices represented by computing device(s) 160 of FIG. 1, for example. This act may be accomplished by the computing system identifying the destination computing devices based on explicit user input that specify the plurality of destination computing devices and/or may be based on various other factors and rules, such as by determining that attributes of electronic content matches particular attributes of selected destination computing devices from a larger plurality of systems/devices, based on routing protocols, based on load balancing rules, and so forth).

It is noted that the plurality of destination computing devices (act 240) are distributed and/or separate computing devices, wherein one destination computing device is not in communication with another computing device and/or does not have access to or knowledge of microsegments (and/or corresponding labels) received by another computing device. In some embodiments, the destination computing devices correspond to transcription entities, wherein the entity is a human transcriber.

It is also noted that the act (act 250) for restrictively distributing the plurality of microsegments will be implemented by one or more of the various components of the computer architecture 100 of FIG. 1, for example, computing device 160, API authorization and authentication 162, encryption 164, segment receiver 166, Eyes-On human labeling 180, and/or data store 132 storing metadata 136. The rules for selectively distributing the electronic content to the destination computing devices will be described in more detail below. As a note, in some embodiments, the term "eyes-on," as used herein, refers to the ability of a human observer or annotator to access a set, or subset, of data. In addition, the term "eyes-off," as used herein, is used to describe access to data being restricted to internal computing systems (i.e., non-human entity).

Figure 3:
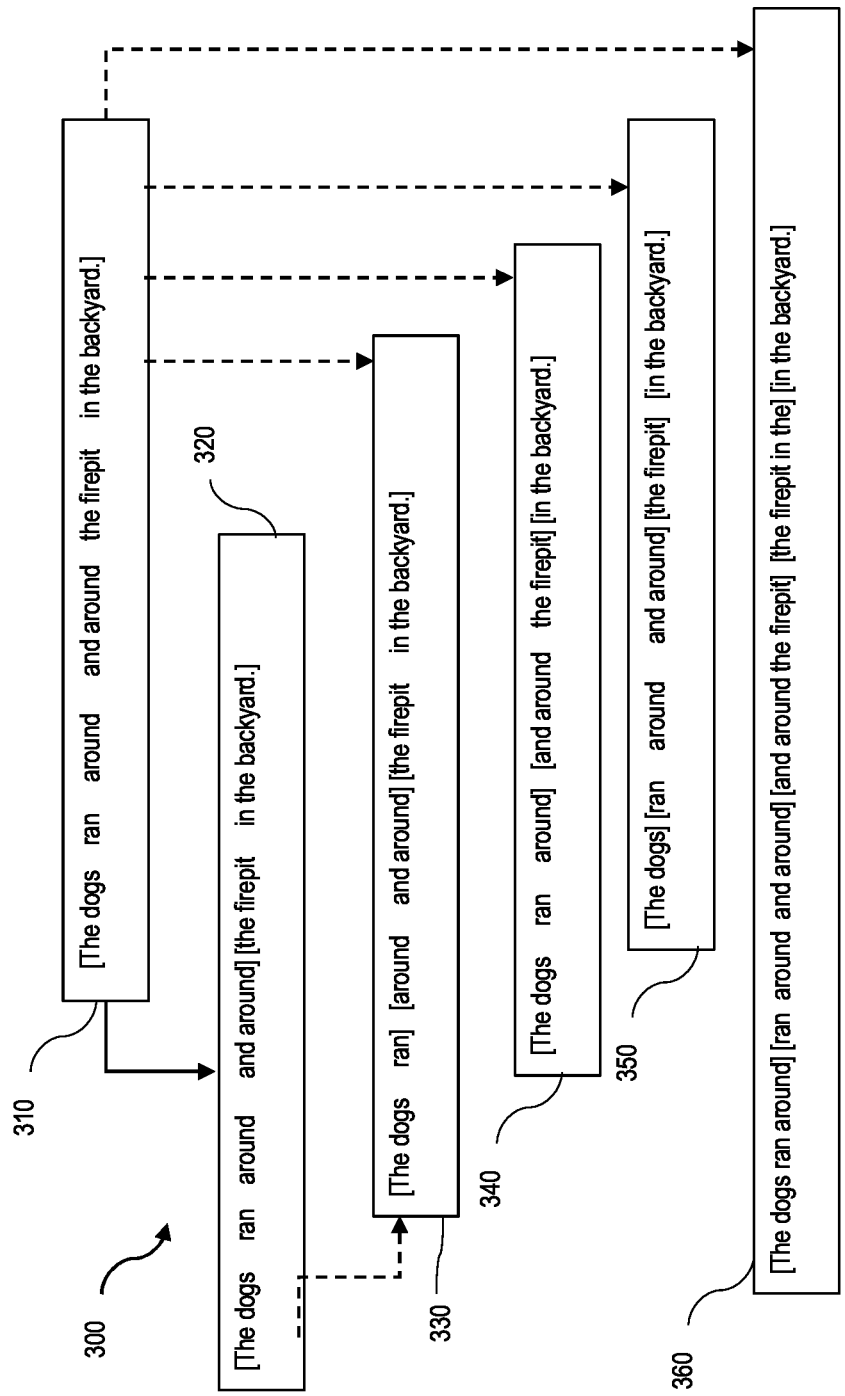
FIG. 3 illustrates a flow diagram of an example of dividing electronic content into microsegments.
Figure 4:
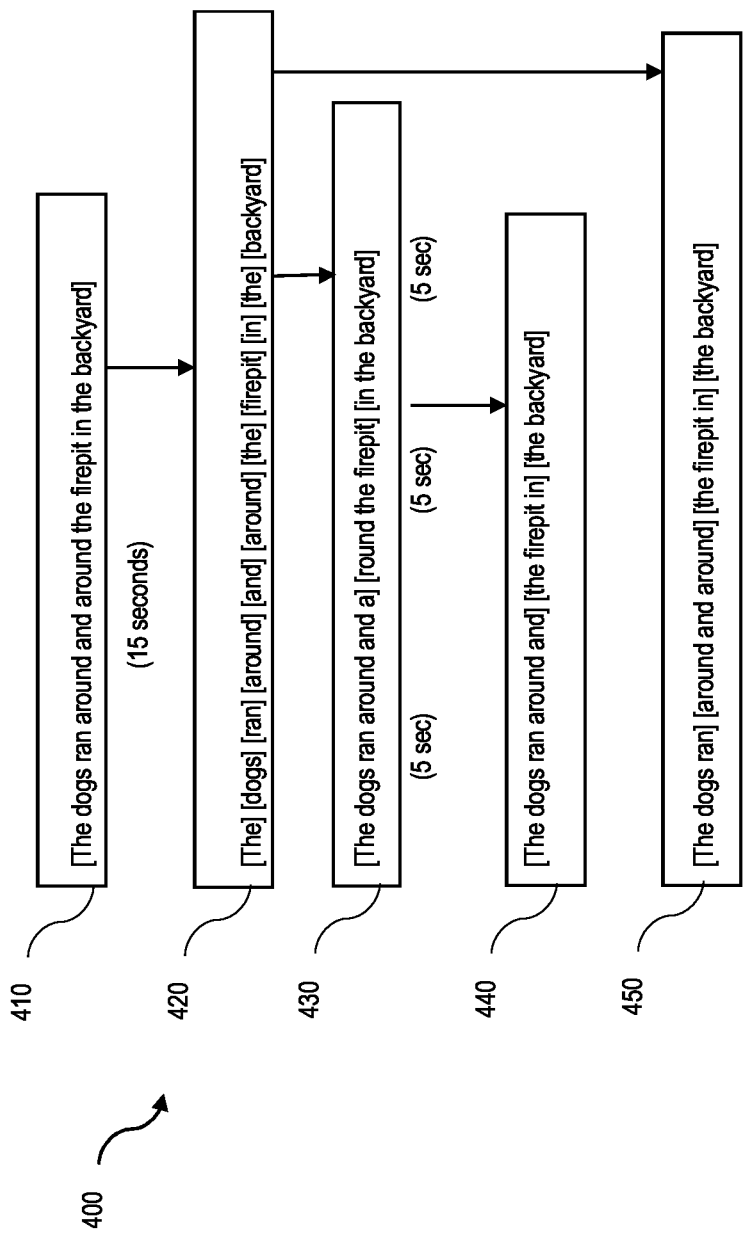
FIG. 4 illustrates a flow diagram of an example of removing partial words while dividing electronic content into microsegments.

Attention will now be directed to FIGS. 3-4 which illustrate exemplary methods and examples associated with dividing (e.g., separating, fragmenting splitting, shredding, or otherwise segmenting) electronic content into microsegments for labeling the electronic content.

In some embodiments, as shown in FIG. 3, electronic content including an original utterance 310 [The dogs ran around and around the firepit in the backyard], which is available for segmentation. A security level corresponding to the original utterance 310 is determined. Once the security level is determined, a particular policy (for example, policy 140 of FIG. 1) from a plurality of policies is chosen, wherein the particular policy dictates that microsegments are to include a maximum number of words, for example no more than six words. In this example, the original utterance 310 is then divided into a plurality of microsegments, specifically two microsegments 320, (i.e., [The dogs ran around and around] & [the firepit in the backyard]) wherein each microsegment includes up to six words. This is an example of static segmentation.

In some embodiments, the two microsegments included in the first divided utterance 320 are distributed to a plurality of destination computing devices. Additionally, or alternatively, to facilitate a multiplicity of distributions of a particular microsegment, the segmentation can be performed to create overlap between the segments, which can facilitate labeling different segments with different contexts to facilitate more accurate labeling and/or verification of accuracy in labeling. For example, in one example, the original utterance 310 is further divided into a second divided utterance 330 (or a second set of microsegments), including a set of three microsegments comprising (1) [The dogs ran], (2) [around and around] and (3) [the firepit in the backyard]. In this case, the original utterance 310 is divided based on natural speech segmentation, for example wherein a slight pause is detected between "ran" and "around" and "around" and "the". The initial segmentation is an example of dynamic segmentation resulting from the identification of the pause attribute during segmentation.

In this example, a second set of microsegments (divided utterance 330) reflects overlap between natural breaks in portions or words of the microsegments of the divided utterance 320, which can be used to provide context in the microsegments for facilitating statistically more accurate transcription labeling.

In some embodiments, generating multiple labels for an utterance, or portion of an utterance, is facilitated by performing a microsegmentation process of dividing an utterance into two or more sets of microsegments (e.g., divided utterance 320 and divided utterance 330, or divided utterance 320 and divided utterance 340, etc.). In some embodiments, multiple labels are generated for portions of an utterance (e.g., utterance 310) by dividing the utterance into a plurality of microsegments, wherein each subsequent microsegment includes a portion of the preceding microsegment (e.g., divided utterance 360).

Additionally, or alternatively, the original utterance 310 may also be divided into a third and/or fourth sets of microsegments (see divided utterance 340, 350) based on varying policies (e.g., policy 140 of FIG. 1). It is noted that the original utterance 310 is able to be divided into any number of sets of microsegments and/or with any number or configuration of overlapping microsegment portions based on words, time duration, or other feature(s). Each set of microsegments may be divided based on varying attributes identified in the original utterance.

In some examples, divided utterance 320 is indicative of a first security level corresponding to the original utterance 310. Following, the divided utterance 350 is indicative of a second security level corresponding to the original utterance 310 wherein the microsegments of divided utterance 350 include between 2 and 4 words indicating that the second security level is heightened compared to the first security level. In some embodiments where the second security level corresponds to the divided utterance 320, it is determined that attributes in the microsegments of divided utterance 320 are to be further divided into fragments. Thus, in some instances, the parsed phrases of divided utterance 350 are microsegments of the original utterance 310 and/or microsegments fragments of the microsegments of divided utterance 320. These embodiments are particularly useful when attempting to add security to the underlying data, such as password data, financial transaction data, personal identification data, and so forth.

It will be appreciated that the original utterance 310 may be divided into divided utterance 320, divided utterance 330, divided utterance 340, divided utterance 350, divided utterance 360, and/or any combination of these and other divided utterances to send to recipient labeling devices/systems. See the description for an exemplary method illustrated in FIG. 5 herein.

Attention will now be directed to FIG. 4, a flow diagram of examples of divided utterances from an original utterance. In some embodiments, the segmentation process may produce partial or truncated words that are difficult to provide an accurate transcription label. In such instances, the partial word(s) is/are removed from the microsegments before the microsegments are distributed to computing devices for labeling. For example, an original utterance 410 is shown as [The dogs ran around and around the firepit in the backyard]. Word boundaries are identified using a variety of methods including based on word timings and predicted start and endings of words. Once word boundaries are identified and defined (see utterance 420), the original utterance 410 is divided into a plurality of microsegments, for example see divided utterance 430. In some embodiments, word boundaries are identified by buffering on both ends to ensure that a critical beginning and/or ending of the words are not missed.

In the instance illustrated and provided only as an example, the original utterance 410 is divided into microsegments having a fixed five second time duration (i.e., a static segmentation policy). However, the first and second microsegments include partials words (for example, "around" is split into "a" and "round"). The partial words are identified by a computing system (for example, computing system 130 of FIG. 1) by comparing the word boundaries 420 of the original utterance 410 against word boundaries identified in the divided utterance 430. In this case, "a" and "round" are identified as partial words and are removed from the divided utterance (see modified divided utterance 440). In some embodiments, the identification and/or removal of partial words triggers the computing system (for example, computing system 130 of FIG. 1), to generate another set of microsegments (see divided utterance 450) that does not include any partial words and still satisfies the initial requirement of less than or equal to a five second duration.

In some embodiments, after the electronic content is divided into microsegments, the microsegments are further modified before being distributed to the plurality of computing devices. In some embodiments, the microsegments are further modified after distribution and labeling, but before reconstruction into reconstructed electronic content. In some embodiments, the reconstructed, labeled microsegments are further modified before being used as training data for machine learning models.

In any of the aforementioned embodiments for making modifications, the modifications may include truncating the microsegments at natural speech breaks that are identified by the computing system, removing partial words identified by the computing system in the microsegments, changing the pitch of spoken audio included in the microsegments, slowing down or speeding up the frequency of spoken audio included in the microsegments, adding room in response noise perturbation, adding white noise or other background noise and/or making other sound or audio modifications.

Notably, changing the pitch of the spoken audio facilitates in improvement in data security because changing the pitch will render the spoken audio unrecognizable by the computing device and/or human transcriber in the case the transcription entity recognizes or remembers a particular voice signature. Furthermore, in some embodiments where a particular microsegment is distributed to a single computing device multiple times, the first distribution of the microsegment to the computing device includes the original speech audio, and subsequent distributions of the microsegment to the same computing device include modified speech audio (e.g., by changing the pitch).

In some embodiments, the computing system chooses a different policy (for example, a policy shown as policy 140 of FIG. 1) to generate the alternate and/or additional set of microsegments. For example, to generate the divided utterance 420, microsegments were generated to be equal to a pre-determined time duration (e.g., five seconds). In some instances, divided utterance 450 includes microsegments generated to be equal to or less than three seconds. Alternatively, divided utterance 450 includes microsegments generated to include equal to or less than N-words (e.g., no more than three words). The additional and/or alternate divided utterance 450 is provided to the computing device for labeling to ensure that all of the words of the original utterance 410 receive at least one corresponding transcription label.

Figure 5:
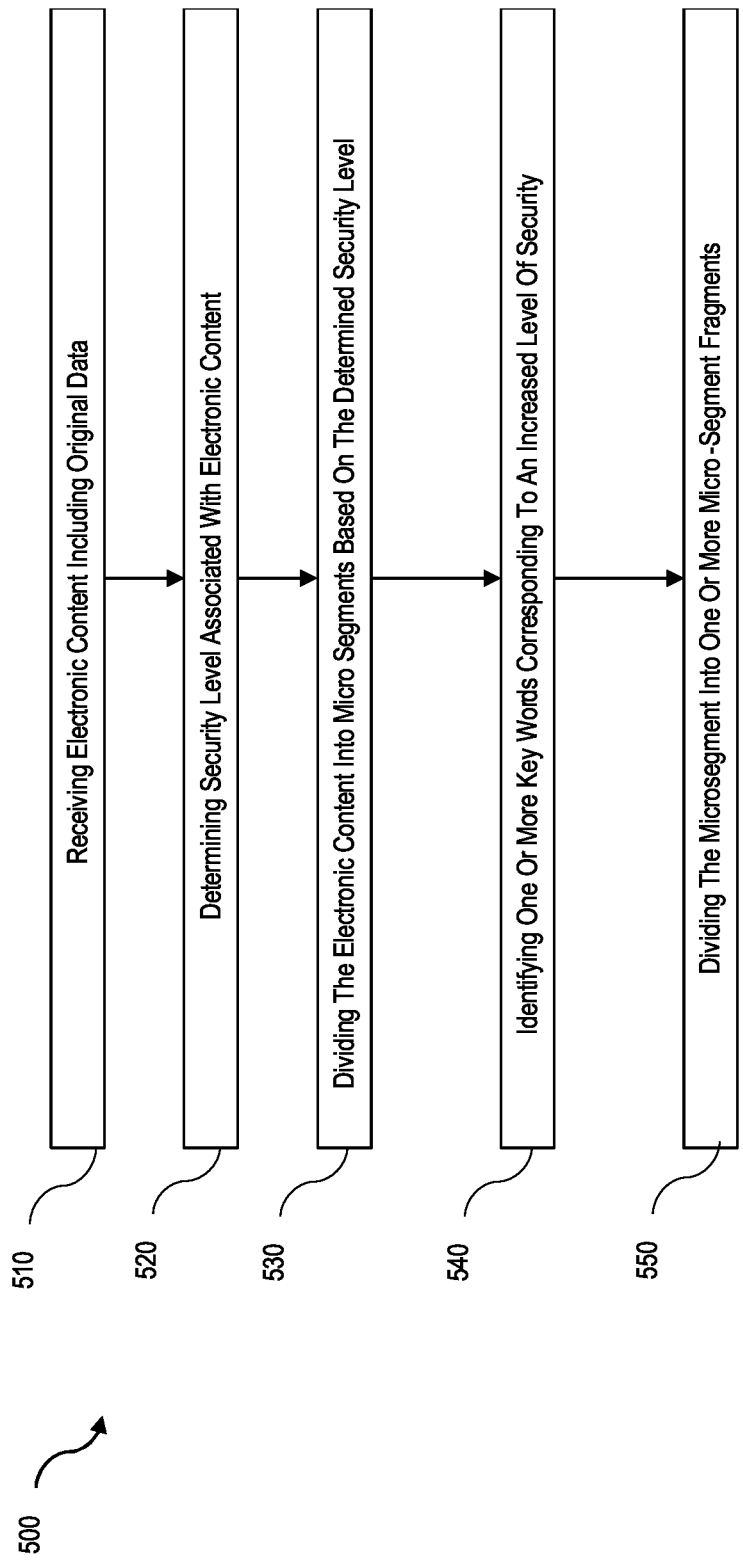
FIG. 5 illustrates a flow diagram of an example method for dividing microsegments into microsegment fragments.

Attention will now be directed to FIG. 5 which illustrates a flow diagram 500 that includes various acts associated with exemplary methods that can be implemented by computing systems, such as computing system 130 described above in reference to FIG. 1 and/or that are associated with securing data access to machine learning training data during labeling processes of the corresponding data.

As shown in FIG. 5, the flow diagram 500 and corresponding methods include an act of a computing system receiving electronic content comprising original data (act 510). The computing system then determines a security level associated with the electronic content (act 520). Thereafter, the computing system selectively divides the electronic content into a plurality of microsegments by duration, the duration of the microsegments being selected according to the determined security level (act 530). Thereafter, the computing system identifies one or more key words associated with a second level of security (act 540). The second level of security is an increased security level compared to the initially determined security level associated with the electronic content. After identifying key words in the microsegments, the keywords corresponding to an increased level of security, the computing system divides the microsegment(s) into one or more microsegment fragments (act 550).

In some embodiments, the one or more keywords (i.e., attributes of the electronic content and/or microsegments) include one or more of the following: personal identification numbers (driver's license numbers, passport numbers, social security numbers, etc.), transaction data (credit card and/or debit card numbers, security codes, pins, transaction confirmations, money transfers, monetary amounts, bank accounts, routing numbers, check numbers, etc.), password data, recovery emails, phone numbers, keyword phrases or words, other series of characters and special characters (ASCII and/or non-ASCII characters), sequences of numbers, one or more names, one or more characters that are identified as not being normal to speech, and/or terms indicative of data associated with a user or account credential. These types of data may be referred to as credential data, authentication data, or verification data.

In some embodiments, keywords are identified by proceeding trigger words. For example, if credit card appears in the beginning of an utterance and/or in a first utterance, then a series of numbers appearing at the end of the utterance and/or in a second utterance is flagged as the keyword corresponding to an increased level of security. In such instances, the first utterance is divided into a plurality of microsegments, and the second utterance is divided into a plurality of microsegments and further divided into microsegment fragments causing the series of numbers to be parsed between microsegment fragments. In some embodiments, only the keyword is divided into fragments. Additionally, or alternatively, only microsegments including one or keywords is divided into microsegment fragments. In some embodiments, where one or more keywords is identified in at least one microsegment fragment, every microsegment of a set or subset of electronic content is subdivided into microsegment fragments.

In some embodiments, the microsegment fragments are formed by fragmenting or otherwise dividing keywords into fragments or partial keywords. Additionally, or alternatively, the microsegments fragments are generated by removing one or more keywords from the microsegments and/or the one or more keywords are removed from the electronic content which is then divided into microsegments.

In some embodiments, the determined security level (act 520) is a first security level associated with the electronic content, wherein the computing system acts upon the electronic content to divide it into a plurality of microsegments. Thus, the identification of keywords corresponding to an increased level of security (the increased level of security being a second security level) causes the computing system to act upon the microsegments to further divide them into microsegment fragments.

In some embodiments, after a first level of security is determined, the computing system identifies one or more keywords corresponding to an increased level of security in the electronic content and automatically divides the electronic content into microsegment fragments.

With regard to the security level, it will be appreciated that this security level may be based on attributes of the audio that are discovered by the computing system, and/or based on metadata received with or associated with the audio when it is received from a third party (e.g., an audio file with metadata descriptors) and/or that may be obtained from looking up the attributes in a database or table that stores attributes for different electronic content, including the audio that is being processed.

In some embodiments, the keywords are identified by a segment divider, for example the segment divider 134 of FIG. 1. In some embodiments, the keywords are identified by a speech service, for example one or more of the speech services 120 of FIG. 1, wherein information about the keywords is included with metadata about the electronic content stored in a data store, for example the data store 132 storing raw data 133 and/or data store 132 storing metadata 136 of FIG. 1.

Segmentation of speech data is highly beneficial for several reasons. In the case where long data sessions are needing to be transcribed, most conventional speech transcription services and/or NLP machine learning models are not able to handle large amounts of data (i.e., in terms of storage quantity vs. available processing memory and/or word length and/or time duration length and/or number of speakers contributing to the data).

In some embodiments, the transcription process is approached by human review for sessions within an allowed length. However, any session above that limit would never be reviewed. In some embodiments, the transcription process includes segmenting the sessions into portions of an allowed length. The microsegments based on time may cut off audio in the middle of words and sometimes may not provide adequate context for accurate human review. Thus, in some embodiments, the disclosed segmentation process beneficially includes sentence end prediction, along with allow length time limits, to perform the segmentation. For example, "this is a great novel, and I highly recommend it for everyone to read" can be segmented into "this is a great novel", "and", "I highly recommend it", "for everyone to read"—wherein each microsegment is divided in such a manner as to have a duration/length under a predetermined threshold length and/or as governed by natural speech breaks.

Furthermore, segmentation of data into microsegments and restricted distribution of those microsegments beneficially facilitates an improvement in data security of the data because no one computing device and/or transcriber will have enough context to decipher the meaning of the data from which the microsegments are divided.

Selective and/or Restrictive Distribution of Microsegments

Figure 6:
FIG. 6 illustrates a flow diagram of an example method for restrictively distributing a plurality of microsegments to a plurality of destination computing devices.

Attention will now be directed to FIG. 6 which illustrates a flow diagram 600 that includes various acts associated with exemplary methods that can be implemented by computing systems, such as computing system 130 described above in reference to FIG. 1 and/or that are associated with securing data access to machine learning training data during labeling processes of the corresponding data, specifically in restrictively distributing electronic data to a plurality of distributed computing devices where the content in the microsegments is labeled by a human and/or an automated system based on observable features/attributes of the microsegments.

As shown in FIG. 6, the flow diagram 600 and corresponding methods include an act of a computing system determining a quantity of microsegments from an electronic content already distributed to a first destination computing device (act 610). The first destination computing device is one of a plurality of distributed computing devices. The computing system, then, identifies a microsegment to be distributed to any one of the plurality of destination computing devices (act 620). After identifying a particular microsegment, the computing system determines that distributing that microsegment to the first destination computing device causes the total number of microsegments distributed to the first destination computing device to exceed a pre-determined threshold (act 630). Thereafter, the computing system determines a quantity of microsegments from the electronic content already distributed to a second destination computing device (act 640). The second destination computing device is one of a plurality of distributed computing devices, for example such as computing device 160 of FIG. 1. The computing system, prior to distributing the identified microsegment to the second destination computing device, determines that the distribution of the identified microsegment will not cause the total number of microsegments distributed to the second computing device to exceed a pre-determined threshold (act 650). When the determination is made that the threshold distribution will not be exceeded, the computing system subsequently distributes the microsegment to the second computing device (act 660) and updates the records to reflect total distributions of the microsegment(s) made to the second computing device.

In some embodiments, the pre-determined threshold is determined based on a security level associated with the electronic content. In some embodiments, the threshold is an upper limit of a total maximum of microsegments. In some embodiments, the threshold is an upper limit of a total maximum of microsegments from a specific set or subset of electronic content from a shared source.

In some embodiments, the microsegments from the quantity of microsegments (act 610) and/or the identified microsegment (act 620) are divided based on a determined level of security (see act 510 of FIG. 5). In some embodiments, the microsegments referenced in flow diagram 600 are divided randomly or based from a plurality of different characteristics (other than and/or including the determined security level). Thus, in some embodiments, the restrictive distribution of the microsegments is not dependent on the microsegments having been divided based on a determined security level associated with the electronic content from which the microsegments were obtained.

Additionally, or alternatively, performing the act(s) for restrictive distribution of the microsegments is based on a determined security level of the microsegment(s) (and/or electronic content from which the microsegment(s) are obtained). For example, wherein a specific microsegment, or set of microsegments, is determined to a have a low security level (below a pre-determined threshold), the microsegment(s) are distributed to one or more computing devices freely and/or randomly (i.e., not restrictively). In some embodiments, the determination of a particular security level corresponding to one or more microsegments and/or the electronic content from which the microsegments were divided triggers (i.e., activates) the computing system to perform restrictive distribution of those microsegments. Furthermore, in some instances, one or more thresholds (act 630, act 650) are tuned and/or adjusted based on the determined security level of the microsegments (and/or corresponding electronic content).

Thus, it should be appreciated that in some instances, one or more acts corresponding to methods associated with flow diagram 400 (and/or flow diagram 500) and one or more acts corresponding to methods associated with flow diagram 600 are performed independently of each other. Whereas, in some instances, the performance of one or more acts associated with flow diagram 600 are dependent on the performance of one or more acts associated with flow diagram 400 (and/or flow diagram 500).

In some embodiments, the disclosed methods also include an act of a computing system accessing a look-up table comprising identifiers, wherein each identifier corresponds to a destination computing device of the plurality of destination computing devices. The computing system then determines a quantity of microsegments already distributed to each of the destination computing devices. Thereafter, the computing system links the identifiers to the quantity of microsegments already distributed to each of the destination computing devices, wherein the quantity of microsegments corresponds to a percentage of total microsegments divided from the electronic content that are distributed to each of the destination computing devices.

In some embodiments, the disclosed methods also include the computing system determining whether a particular microsegment to be distributed to a second or recipient computing system is consecutive (from a predetermined set of data that has been segmented) to a previous microsegment that was already distributed to that recipient computing system from the particular defined data set. Then, the system restricts that particular microsegment from being sent to the recipient computing system if it is determined one is consecutive to the other from the set of microsegments created same underlying data set.

In some embodiments, the computing system also determines (prior to making a particular distribution of a particular microsegment) that distributing the particular segment to a second destination computing device does not cause a total number of microsegments distributed to the second destination computing device to exceed a pre-determined threshold, while still facilitating a multiplicity of transcription labels being obtained for a particular microsegment.

It should be appreciated that the microsegments will be distributed according to a variety of methods, wherein the selectivity or restrictive nature of the distribution is based on various criteria. For example, in some embodiments, the microsegment threshold for each computing device is a maximum value or number of microsegments. In some embodiments, the microsegment distribution is restricted based on a threshold for how many consecutive microsegments a computing device receives. In such instances, there may be no upper limit to the total number of microsegments, so long as the computing system does not receive X-number of consecutive microsegments. In some embodiments, the threshold value is fixed. In some embodiments, the threshold value is based on a determined security level of the electronic content and/or based on keywords identified by the computing system that are associated with an increased level of data security.

Conflict Resolution for Reconstructed Electronic Content

Figure 7:
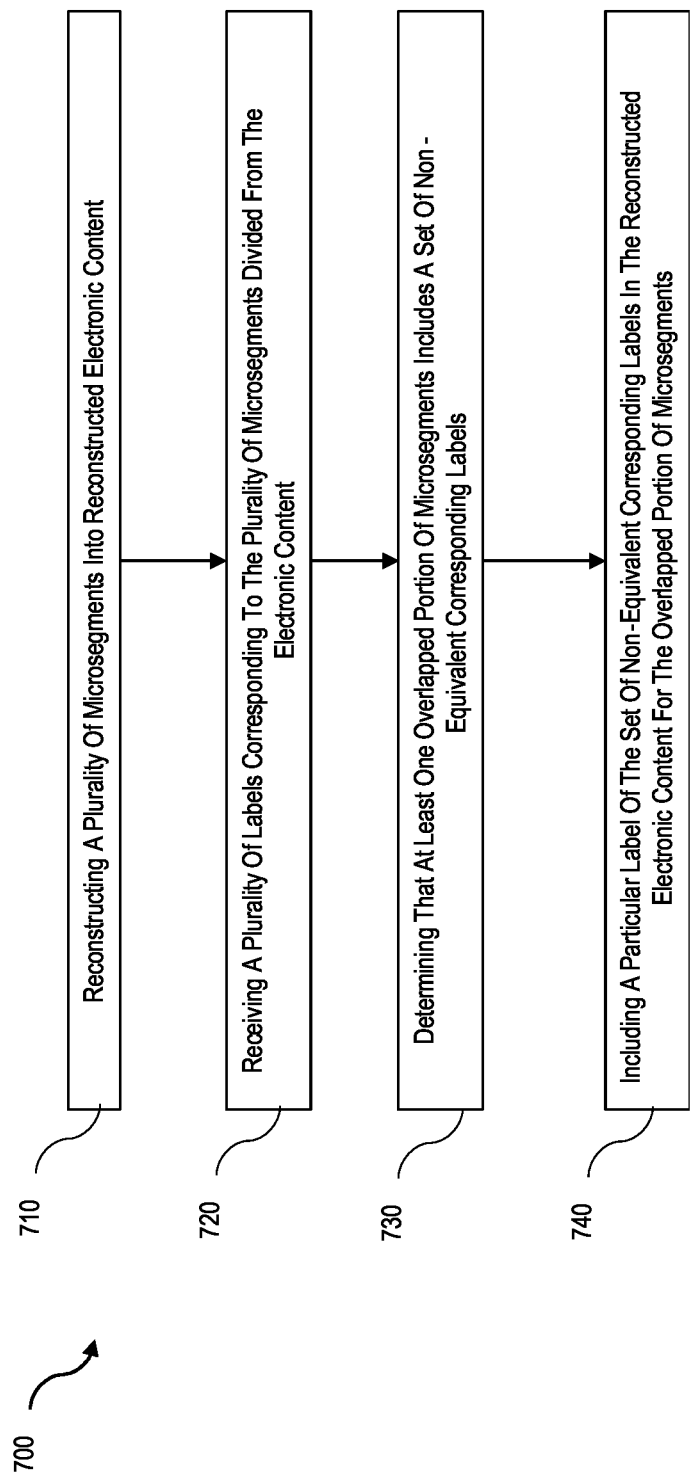
FIG. 7 illustrates a flow diagram of an example method for reconstructing a plurality of labeled microsegments.

Attention will now be directed to FIG. 7 which illustrates a flow diagram 700 that includes various acts associated with exemplary methods that can be implemented by computing systems, such as computing system 130 described above in reference to FIG. 1 and/or that are associated with securing data access to machine learning training data during labeling processes of the corresponding data, including techniques for resolving conflicts between non-equivalent labels for particular microsegments.

In some embodiments, after electronic content is divided into microsegments, the microsegments are distributed to a plurality of computing devices configured to apply transcription labels to the microsegments (for example, see data labels 168 of FIG. 1). In some instances, the same microsegment will be distributed to more than one computing device, wherein a duplicate or multiple transcription labels will be generated by different computing devices for the same microsegment. Sometimes, however, the two or more transcriptions for a particular microsegment may not agree or have different labels for the same words or portions of the microsegments.

In some embodiments, electronic content is divided into two or more sets of microsegments, wherein between the two sets, one or more microsegments (or one or more portions of microsegments) of a first set overlap with one or more microsegments (or one or more portions of microsegments). Thus, when these sets of microsegments are distributed to different computing devices, the applied labels returned from the computing devices for the overlapping portions sometimes are not identical. For examples, see FIGS. 3 and 4. There are a plurality of ways described herein to perform conflict resolution to determine which of the plurality of transcription labels are to be included in the generation of training data for a machine learning model being configured for speech recognition or NLP applications.

As shown in FIG. 7, the flow diagram 700 and corresponding methods include an act of a computing system reconstructing a plurality of microsegments into reconstructed electronic content (act 710). The computing system then receives a plurality of labels corresponding to the plurality of microsegments divided from the electronic content (act 720). Thereafter, the computing system determines that at least one overlapped portion of the microsegments includes a set of non-equivalent corresponding labels (act 730). After determining the non-equivalent duplicate labels for the microsegments, the computing system includes a particular label of the set of non-equivalent corresponding labels in the reconstructed electronic content for the overlapped portion of the microsegments (act 740).

In some embodiments, the microsegments are beneficially reconstructed, or reordered, to mirror the chronological and/or consecutive sequencing of the initially divided utterance (the divided utterance including the plurality of microsegments divided from electronic content, for example see divided utterances 320, 330, 340, 350 of FIG. 3) before the microsegments were distributed for transcription labeling to maintain data integrity of the electronic content for generating the training data. Additionally, or alternatively, the microsegments and corresponding labels may be reconstructed based on matching security levels, similar keywords, matching and/or similar data sources, similar speaker attributes, or based on other attributes identified in the microsegments.

In some embodiments, only one transcription label is chosen for inclusion in the reconstructed electronic content used for training data. In some embodiments, one or more transcriptions labels are chosen for inclusion in the reconstructed electronic content used for training data. In some instances, the multiple transcription labels include a weighting for each transcription label in evaluating efficacy and/or accuracy of the machine learning model undergoing training via the training data. It should be appreciated that the reconstructed electronic content may be used for training and/or evaluation of the machine learning model.

Figure 8:
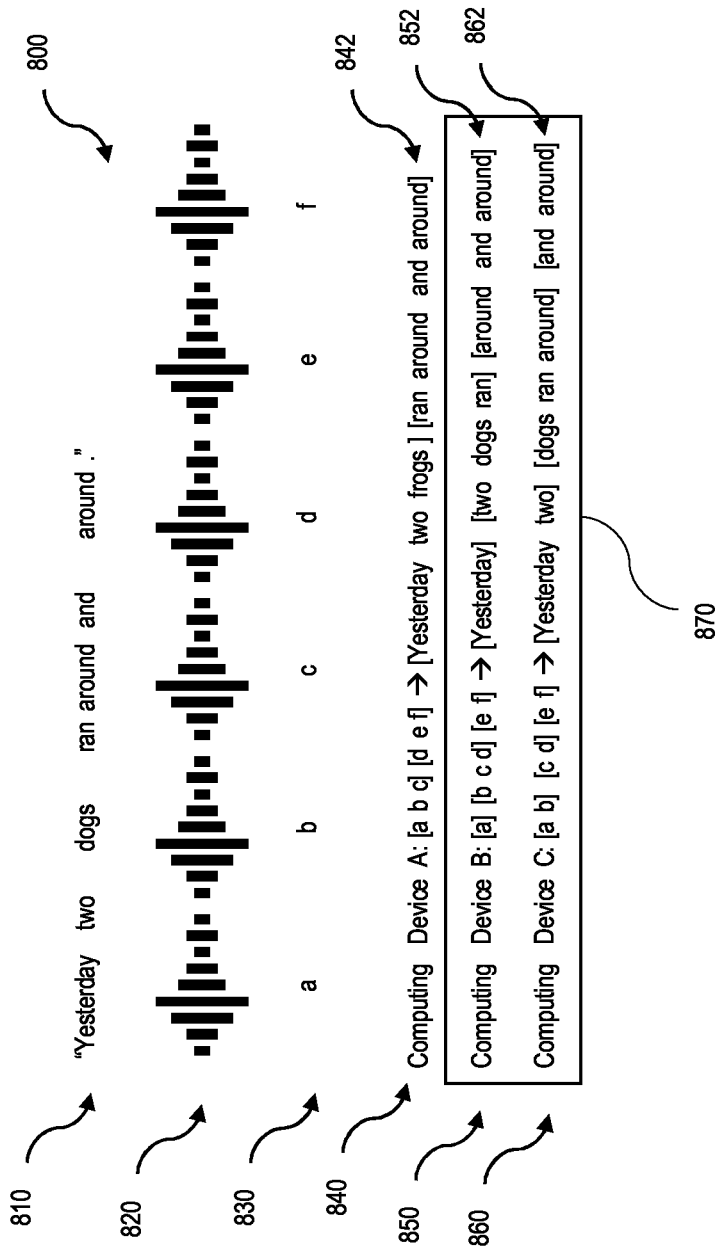
FIG. 8 illustrates an example of resolving non-equivalent labels during a reconstructing process through voting.
Figure 9:
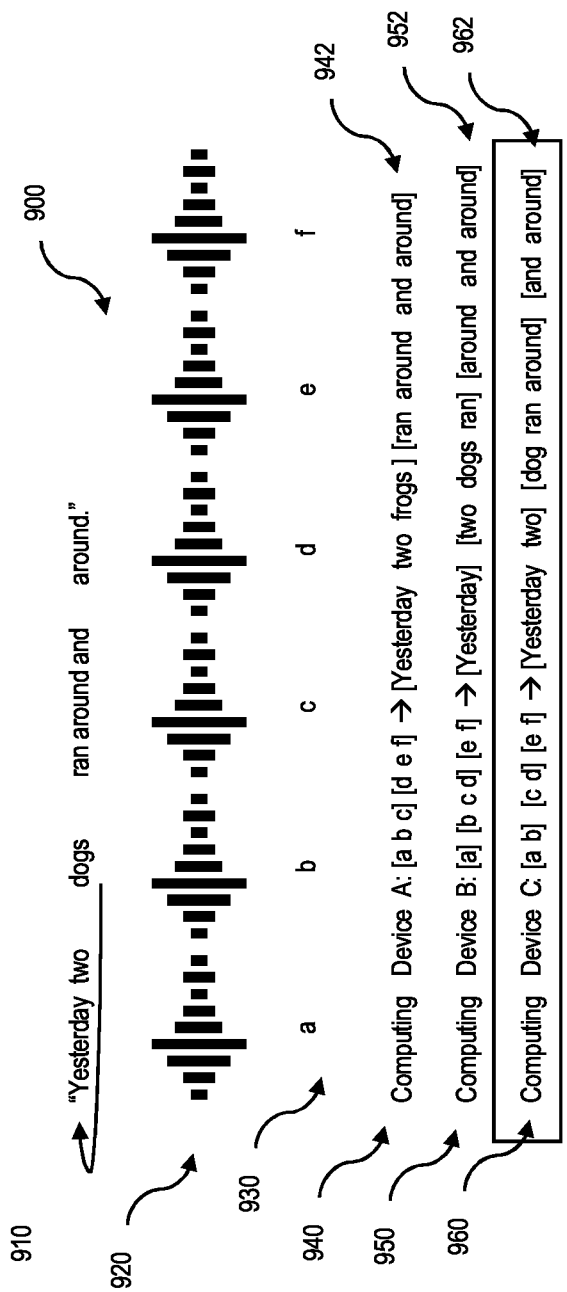
FIG. 9 illustrates an example of resolving non-equivalent labels during a reconstructing process through context weighting.

Attention will now be directed to FIGS. 8 and 9 which illustrate examples of resolving non-equivalent transcription labels for a particular microsegment. For example, FIG. 8 illustrates an example that includes various configurations associated with exemplary methods that can be implemented by computing systems, such as computing system 130 described above in reference to FIG. 1 and/or that are associated with securing data access to machine learning training data during labeling processes of the corresponding data. More specifically, the methods are associated with resolving conflicts between non-equivalent labels for particular microsegments.

FIG. 8 shows an utterance 810 including audio content for the spoken "Yesterday two dogs ran around and around" spoken by a particular speaker. The audio frequencies 820 recorded from and associated with the utterance 810 is shown below the utterance 810. The audio recording 820 is shown divided into a plurality of microsegments 830 and distributed (with restricted distribution) to different destination systems for labeling, as shown in lines 840, 850, 860. Portions of the audio recording utterance 820 are illustrated as alphabetic labels a, b, c, d, e, and f, wherein each microsegment comprises one or more audio recording portions. (It should be appreciated that the microsegments may be generated and distributed via any one of a plurality of segmentation and distribution methods described herein.)

In the present example, the set of microsegments are distributed to a plurality of recipient computing devices (A, B, C), each of which is configured as computing device 160 of FIG. 1, for instance. In the illustrated example, different microsegments are created and distributed to computing device A (i.e., microsegments [a,b,c] and [d,e,f]), to computing device B (i.e., microsegments [a], [b,c,d] and [e,f]), and to computing device C (i.e., microsegments [a,b], [c,d] and [e,f]), such that they each get the full set of the electronic content for utterance 810 (a, b, c, d, e and f). This example is provided to show how conflict resolution may occur, while appreciating that in some instances the microsegments for a full utterance, or consecutive microsegments of an utterance will not be sent to any particular computing system, in some instances and as described previously, based on security policies (when applicable). This example also shows how different microsegments for the same utterance can be distributed to different devices for labeling, wherein the different microsegments will overlap different portions of the underlying electronic content in some instances (e.g., as shown in box 870, wherein one microsegment of content (b, c, d) sent to device B will overlap with microsegments of content (a,b) and (c, d, e) that are sent to device C).

In FIG. 8, the reconstructed microsegments include reconstructed or labeled electronic content 842, 852, 862, corresponding to the labels provided by computing devices A, B, and C, respectively. As shown, the computing devices generated equivalent labels for audio recording portions represented by a, b, d, e, and f. For audio recording portion c, however, only computing devices B and C generated equivalent labels (see "dogs"), while computing device A generated a non-equivalent label (see "frogs").

In some embodiments, wherein only one transcription label (of conflicting labels) is chosen for inclusion in training data, voting by a majority may be applied to determine which label is included. For example, since two computing devices generated "dogs" for audio portion c and only one computing device generated "frogs," the majority winner is "dogs." In some embodiments, wherein a weighting is applied between labels, an equal weighting is applied to "dogs" for computing device B and "dogs" for computing device C, while a lesser weighting is applied to "frogs" for computing device A.

The voting may be done automatically by the computing system when non-equivalent labels are identified. Additionally, or alternatively, the voting may be performed by a third-party human labeler.

In some instances, it is known that a particular computing device generates more accurate transcription labels, and thus all transcription labels generated from that particular computing device may be more heavily weighted for inclusion in ground truth for training data.

In other embodiments, all or a plurality of conflicting labels are included in the training data with different probability of accuracy weights being associated with the different labels to be consumed and processed by the training models.

FIG. 9 illustrates an additional or alternative means for conflict resolution of non-equivalent transcription labels. For example, an utterance 910 is shown with its corresponding graphical representation of the audio recording 920. Portions 930 of the audio recording are represented by alphabetic labels a, b, c, d, e, and f. The utterance is divided into one or more sets of microsegments, for example utterance 910 is divided into three sets of microsegments, wherein each set of microsegments is distributed to a plurality of computing devices, for example computing device A 940, computing device B 950, and computing device C 960. All of the illustrated computing devices generated equivalent labels (see labels 942, 952, 953) for audio recording portions a, b, d, e, and f. However, each computing device generated a non-equivalent label for audio recording portion 'c' (see "frogs" vs "dogs" vs "dog").

In some embodiments, wherein only a single transcription label is chosen for inclusion in the reconstructed electronic content and/or when multiple transcription labels are included in the training and/or evaluation data, context weighting may be applied to determine the best label (i.e., the label most likely to be accurate for the corresponding audio portion and/or word of the utterance).

In this example, referring to computing device B, because the label for portion c was generated using a microsegment wherein audio portion c was both preceded and succeeded by another word "two dogs ran," the computing system (and/or computing device and/or human entity) will determine that labeling provided by device B for labeling portion 'c' has more context, or a greater contextual weighting for labeling portion 'c,' resulting in the system choosing device B's label of "dogs" for portion 'c.' In other words, the computing device B had the greatest access to context for labeling portion 'c', with context before and after portion 'c' in the microsegment [b,c,d] that was received for labeling. In contrast, neither of the other devices (A or C) had as much context for labeling portion c from a single received microsegment, each having only context before or after portion 'c' in the separate microsegments they received with portion 'c' (e.g., device A received segment [a,b,c] and device C received segment [c,d].

This point is even more relevant when devices do not receive the full set of microsegments (or consecutive microsegments) for an utterance, but only limited microsegments of the entire utterance being labeled, which further restricts access to corresponding context for any particular term/portion of the utterance to be labeled.

Deduction logic confirms the assumption that greater context is associated with a higher likelihood of producing an accurate label. For example, in the case of computing device a, "frogs" may be accurate because of the context of the preceding word "two" indicating a plurality. However, in the case of computing device c, "dog" may be more accurate than "frogs" because "dog" is generally more associated with the verb "ran" than "frogs." Furthermore, as shown, the transcription label generated by computing device B is beneficially selected (and/or weighted more heavily than the other transcription labels for audio portion c) because context from preceding word "two" is generally associated with a plurality (suggesting a plural form of a noun) and "ran" is generally more associated with "dogs" than "frogs." Thus, the inclusion of the transcription label(s) generated by computing device B facilitate the generation of effective training data because the labels match most closely the original utterance 910.

In some embodiments, each transcription label may receive a different weighting score due to the identified context. For example, transcription label 942 receives a first weighting score, transcription label 952, and transcription label 952 receives a third weighting score, wherein the weighting score for transcription label 952 is higher than the others because of greater level of context (i.e., a preceding word and succeeding word) for the non-equivalent label for audio portion c. In some embodiments, weighting scores for transcription labels 942 and 962 are equal (i.e., only one of a preceding or succeeding word). In some embodiments, the transcription labels 942 and 962 are not equal, wherein it is determined that either a preceding context (e.g., word, phrase, etc.) or a succeeding context provides a greater or lesser context to the non-equivalent label.

Figure 10:
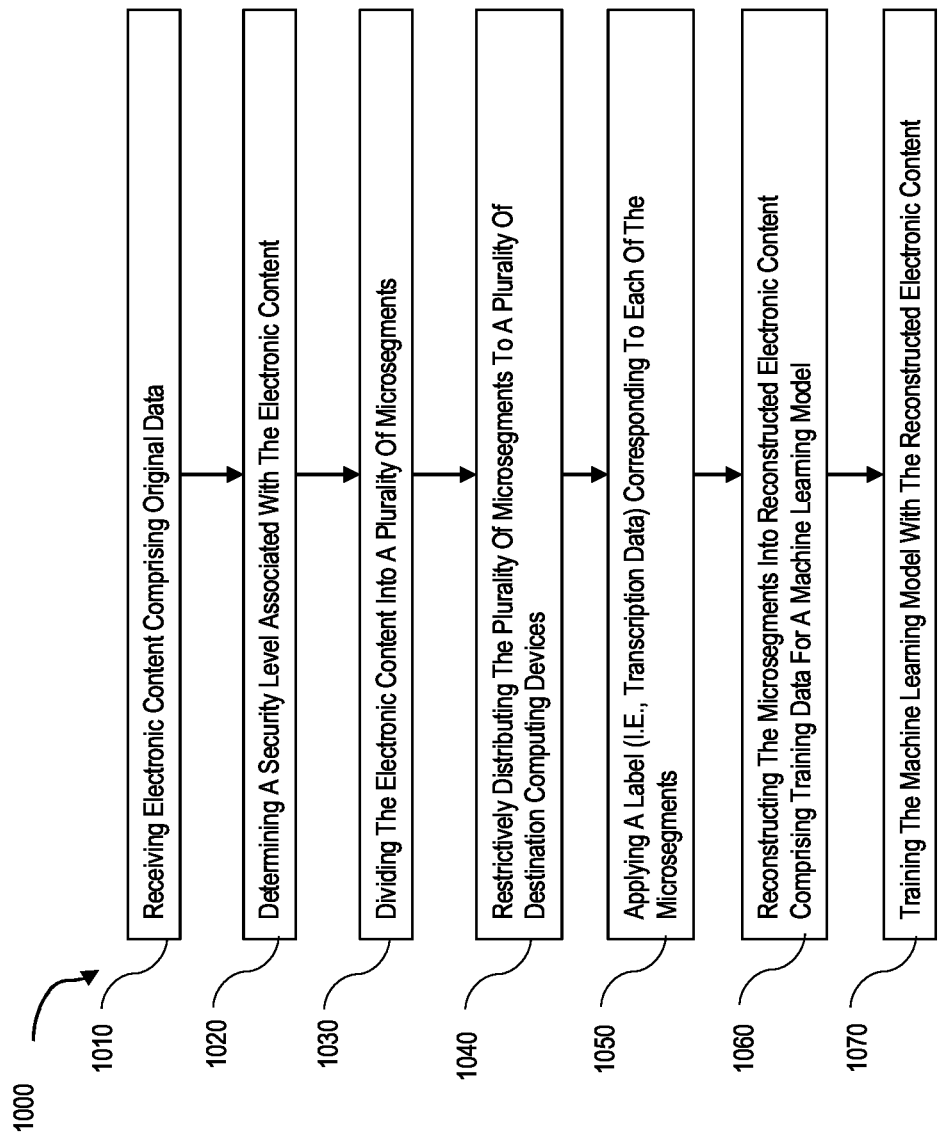
FIG. 10 illustrates a flow diagram of an example for training a machine learning model with training data formed from labeled, reconstructed microsegments.

Attention will now be directed to FIG. 10 which illustrates a flow diagram 1000 that includes various acts associated with exemplary methods that can be implemented by computing systems, such as computing system 130 described above in reference to FIG. 1 and/or that are associated with securing data access to machine learning training data during labeling processes of the corresponding data.

As shown in FIG. 10, the flow diagram 1000 and corresponding methods include an act of a computing system receiving electronic content comprising original data (act 1010). The computing system then determines a security level associated with the electronic content (act 1020). Thereafter, the computing system selectively divides the electronic content into a plurality of microsegments by duration, the duration of the microsegments being selected according to the determined security level (act 1030). Thereafter, the computing system selectively and restrictively distributes the plurality of microsegments to the plurality of destination computing devices (act 1040). Notably, the act of distributing the microsegments (act 1040) also includes, in some instances, limiting or otherwise restricting distribution of the microsegments so that only a pre-determined quantity of microsegments from the original data (or a predefined data set of the original data) is distributed to any one of the destination computing devices.

After distribution, the computing system causes each computing device of the plurality of destination computing devices to apply a label (i.e., a transcription label) corresponding to each of the microsegments (act 1060). The computing system then reconstructs the microsegments (and corresponding labels) into reconstructed electronic content comprising training data for a machine learning model. Finally, the computing system trains the machine learning model with the reconstructed electronic content (act 1070). This training may include applying the context and/or probability of accuracy weights that are included with or associated with the different labels of the reconstructed microsegments, particularly when multiple labels are provided for the same portions of the electronic content being used in the training data.

It will also be appreciated that in addition to using the reconstructed training data for training models, the reconstructed training data is also used, in some instances, for fine-tuning an already trained machine learning model. In some embodiments, the machine learning model is trained for speech recognition, optical character recognition, and/or natural language processing.

Additionally, it is anticipated that the reconstructed electronic content, including microsegments and corresponding labels, will also be further processed and/or modified before inclusion or generation of machine learning training data in some instances.

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or transmit desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general-purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method implemented by a computing system for securing data access of machine learning training data at a plurality of distributed computing devices, the method comprising:
   the computing system receiving electronic content comprising original data;
   the computing system determining a security level associated with the electronic content;
   the computing system determining a microsegment duration based on the determined security level;
   the computing system selectively dividing the electronic content into a plurality of microsegments according to the microsegment duration determined based on the determined security level;
   the computing system identifying a plurality of destination computing devices configured to apply a plurality of labels corresponding to the plurality of microsegments;
   the computing system determining a threshold quantity of microsegments based on the determined security level;
   the computing system restrictively distributing the plurality of microsegments to the plurality of destination computing devices in accordance with the threshold quantity of microsegments determined based on the determined security level, wherein the restricted distribution includes restricting a quantity of microsegments to be distributed to any one of the destination computing devices to less than the threshold quantity of microsegments determined based on the determined security level;
   the computing system receiving a plurality of labels corresponding to plurality of microsegments divided from the electronic content, the plurality of labels being provided by at least two of the plurality of destination computing devices;
   the computing system reconstructing the plurality of microsegments into reconstructed electronic content comprising the plurality of labels corresponding to the plurality of microsegments, wherein the reconstructed electronic content further comprises microsegments that are divided to include portions of microsegments that overlap each other, wherein the reconstructed electronic content comprises training data for a machine learning model;
   the computing system determining that at least one overlapped portion of microsegments includes a set of non-equivalent corresponding labels; and
   the computing system selecting a particular label of the set of non-equivalent corresponding labels for inclusion in the reconstructed electronic content for the overlapped portion of microsegments.

2. The method of claim 1, wherein the computing system dividing the electronic content into a plurality of microsegments further comprises dividing the electronic content into the plurality of microsegments with a first microsegment that has content that overlaps with at least a portion of a second microsegment.

3. The method of claim 2, wherein the first microsegment has content that overlaps the second microsegment by a pre-determined quantity of words, the quantity of words being identified by the computing system during the dividing of the electronic content into at least the first and second microsegments.

4. The method of claim 3, further comprising:
   the computing system determining that a microsegment is to be further subdivided into two or more microsegment fragments based on detecting a set of one or more attributes of the microsegment that corresponds to an increased level of data security compared to the determined security level.

5. The method of claim 4, wherein the set of one or more attributes of the microsegment comprises one or more of the following: a sequence of numbers, one or more names, one or more characters or symbols that are identified as not being normal to speech, or specific terms including account number, bank, credit card, or other word or phrase determined to be indicative of data associated with a user or account credential.

6. The method of claim 1, further comprising modifying the microsegments by one or more of the following:
   removing partial words identified by the computing system in the microsegments; or
   changing a pitch of spoken audio included in the microsegments.

7. The method of claim 1, further comprising:
   accessing a look-up table comprising identifiers, wherein each identifier corresponds to a destination computing device of the plurality of destination computing devices;
   determining a quantity of microsegments already distributed to each of the destination computing devices; and
   linking the identifiers to the quantity of microsegments already distributed to each of the destination computing devices, wherein the quantity of microsegments corresponds to a percentage of total microsegments divided from the electronic content that are distributed to each of the destination computing devices.

8. The method of claim 1, the method further comprising:
   determining a quantity of microsegments already distributed to a first destination computing device;
   identifying a particular microsegment to be distributed to any destination computing devices;
   determining that distributing the microsegment to the first destination computing device causes a total number of microsegments distributed to the first destination computing device to exceed the threshold quantity of microsegments;

determining a quantity of microsegments already distributed to a second destination computing device;
determining that distributing the particular microsegment to the second destination computing device does not cause the total number of microsegments distributed to the second destination computing device to exceed the threshold quantity of microsegments; and
distributing the particular microsegment to the second destination computing device.

9. The method of claim 1, the method further comprising:
determining a quantity of microsegments already distributed to a first destination computing device;
identifying a particular microsegment to be distributed to one of the destination computing devices of the plurality of destination computing devices;
determining that the particular microsegment is consecutive to a pre-determined number of microsegments of the quantity of microsegments already distributed to the first destination computing device;
determining a quantity of microsegments already distributed to a second destination computing device;
determining that the particular microsegment is not consecutive to a pre-determined number of microsegments of the quantity of microsegments already distributed to the second destination computing device; and
distributing the particular microsegment to the second destination computing device.

10. The method of claim 1, the method further comprising:
identifying a particular microsegment to be distributed to one of the destination computing devices of the plurality destination computing devices;
determining that distributing the particular microsegment to a first destination computing device does not cause a total number of microsegments distributed to the first destination computing device to exceed the threshold quantity of microsegments;
distributing the particular microsegment to the first destination computing device;
determining that distributing the particular microsegment to a second destination computing device does not cause a total number of microsegments distributed to the second destination computing device to exceed the threshold quantity of microsegments; and
distributing the particular microsegment to the second destination computing device.

11. The method of claim 1, the method further comprising:
the computing system receiving a plurality of labels corresponding to plurality of microsegments divided from the electronic content, the plurality of labels being provided by at least two of the plurality of destination computing devices.

12. The method of claim 1, further comprising:
the computing system training the machine learning model with the reconstructed electronic content comprising training data for the machine learning model.

13. The method of claim 1, wherein the particular label of the set of non-equivalent corresponding labels is selected for inclusion in the reconstructed electronic content based on a determination that the particular label of the at least one overlapped portion is provided for a first microsegment that has an increased level of context relative to a second microsegment that has a different label for the at least one overlapped portion.

14. A computing system configured for securing data access of machine learning training data at a plurality of distributed computing devices, wherein the computing system comprises:
one or more processors; and
one or more computer readable hardware storage devices that store computer-executable instructions that are structured to be executable by the one or more processors to cause the computing system to at least:
receive electronic content comprising original data corresponding to a determined security level;
selectively divide the electronic content into a plurality of microsegments by duration, the duration of the microsegments being selected according to the determined security level associated with the electronic content;
identify a plurality of destination computing devices configured to apply a plurality of labels corresponding to the plurality of microsegments;
restrictively distribute the plurality of microsegments to the plurality of destination computing devices, wherein the restricted distribution includes restricting a quantity of microsegments associated with the original data to be distributed to any one destination computing device of the plurality of destination computing devices to less than a pre-determined threshold, wherein the pre-determined threshold is determined based on the determined security level;
receive a plurality of labels corresponding to plurality of microsegments divided from the electronic content, the plurality of labels being provided by at least two of the plurality of destination computing devices;
reconstruct the plurality of microsegments into a reconstructed electronic content comprising the plurality of labels corresponding to the plurality of microsegments, wherein the reconstructed electronic content further comprises microsegments that are divided to include portions of microsegments that overlap each other, wherein the reconstructed electronic content comprises training data for a machine learning model;
determine that at least one overlapped portion of microsegments includes a set of non-equivalent corresponding labels; and
selecting a particular label of the set of non-equivalent corresponding labels for inclusion in the reconstructed electronic content for the overlapped portion of microsegments.

* * * * *